(12) United States Patent
Williamson et al.

(10) Patent No.: US 8,077,754 B1
(45) Date of Patent: Dec. 13, 2011

(54) POOL POWER CONTROL IN REMELTING SYSTEMS

(76) Inventors: Rodney L. Williamson, Albuquerque, NM (US); David K. Melgaard, Albuquerque, NM (US); Joseph J. Beaman, Austin, TX (US)

( * ) Notice: Subject to any disclaimer, the term of this patent is extended or adjusted under 35 U.S.C. 154(b) by 932 days.

(21) Appl. No.: 11/501,198

(22) Filed: Aug. 8, 2006

(51) Int. Cl.
*H05B 7/144* (2006.01)
*H05B 3/60* (2006.01)

(52) U.S. Cl. ............. 373/102; 373/47; 373/49; 373/50; 373/70

(58) Field of Classification Search ............ 373/49, 373/50, 70, 102, 105
See application file for complete search history.

(56) References Cited

U.S. PATENT DOCUMENTS

| 4,483,708 | A | * | 11/1984 | Gfrerer et al. | ................. 266/90 |
| 6,115,404 | A |  | 9/2000 | Bertram et al. | |
| 6,603,795 | B2 | * | 8/2003 | Ma et al. | ...................... 373/102 |

OTHER PUBLICATIONS

R.L. Williamson "Model based gap and melt rate control for VAR of Ti-6Al-4V", 2004, Journal of Materials Science, 39, 7153-7159.*
Williamson, Rodney L., et al., "Model-Based Melt Rate Control during Vacuum Arc Remelting of Alloy 718", Metallurgical and Materials Transactions B, Vo. 35, No. 1, (Feb. 2004), 101-113.

* cited by examiner

*Primary Examiner* — Henry Yuen
*Assistant Examiner* — Hung D Nguyen
(74) *Attorney, Agent, or Firm* — Bauman, Doiu & León, P.C.; Alberto A. León

(57) ABSTRACT

An apparatus for and method of controlling a remelting furnace comprising adjusting current supplied to an electrode based upon a predetermined pool power reference value and adjusting the electrode drive speed based upon the predetermined pool power reference value.

10 Claims, 9 Drawing Sheets

POOL POWER CONTROL IN REMELTING SYSTEMS

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

CROSS-REFERENCE TO RELATED APPLICATIONS

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for controlling remelting processes, namely vacuum arc remelting (VAR) and electro-slag remelting (ESR) processes.

2. Description of Related Art

In the VAR process, a cylindrically shaped, alloy electrode is loaded into the water-cooled, copper crucible of a VAR furnace, the furnace is evacuated, and a direct current (dc) arc is struck between the electrode (cathode) and some start material (e.g., metal chips) at the bottom of the crucible (anode). The arc heats both the start material and the electrode tip, eventually melting both. As the electrode tip is melted away, molten metal drips off and an ingot forms in the copper crucible. Because the crucible diameter is larger than the electrode diameter, the electrode must be translated downward toward the anode pool to keep the mean distance between the electrode tip and pool surface constant. The speed at which the electrode is driven down is called the electrode feed rate or drive speed. The mean distance between the electrode tip and the ingot pool surface is called the electrode gap.

Pool power control involves simultaneously controlling the electrode feed rate and melting current to regulate the energy flux to the ingot pool surface. The fraction of total power consumed by melting is given by $f_m$. Under the assumption of steady-state thermal conditions in the electrode, conduction losses along the electrode may be neglected because the electrode burn-off rate matches the rate at which the thermal boundary layer front propagates up the electrode. Neglecting radiation, the melting power is equal to the total power absorbed from the arc plasma by the electrode tip due to electron and ion impacts. This power is input to the ingot pool as heat contained in the dripping metal. The pool also receives power from the arc plasma. Thus, under nominal, steady-state conditions, total power to the ingot surface is approximated by $$P_{pool} \approx \dot{M} h_{M,sup} + f(1-f_m)IV$$

where f is the fraction of the arc plasma power collected by the ingot surface, I is current, V is voltage, $\dot{M}$ is electrode melt rate and $h_{M,sup}$ is the mass specific enthalpy at superheat temperature contained in the metal dripping from the electrode tip. Under nominal processing conditions for Alloy 718, ~85% of the total power available is collected by the pool as arc power and melt power, the rest being collected as arc power by the crucible wall above the ingot surface.

The present invention provides a method and apparatus to control a VAR (or ESR) process by controlling $P_{pool}$ during it. Current state-of-the-art VAR controllers seek to control electrode gap and melt rate. However, melt rate control during transient melting conditions allows for large excursions in melt power and, therefore, power delivered to the ingot pool surface. This, in turn, causes variations in the solidification rate of the electrode which may lead to the formation of solidification defects in the ingot.

BRIEF SUMMARY OF THE INVENTION

The present invention is of an apparatus for and method of controlling a remelting furnace, comprising: adjusting current supplied to an electrode based upon a predetermined pool power reference value; and adjusting the electrode drive speed based upon the predetermined pool power reference value. In the preferred embodiment, one additionally provides the adjusted current and electrode drive speed as inputs to a controller (preferably nonlinear). The two adjusting steps are also based upon output from the controller, preferably wherein adjusting current employs an estimated current bias output from the controller and adjusting drive speed employs an estimated electrode drive speed bias output from the controller. The controller employs Equation (3) in its operation, adjusting current employs Equation (4), and adjusting drive speed employs Equation (5). Adjusting drive speed is preferably additionally based upon a predetermined gap distance of the electrode from a surface of a pool of molten metal or a predetermined depth of the electrode in slag.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
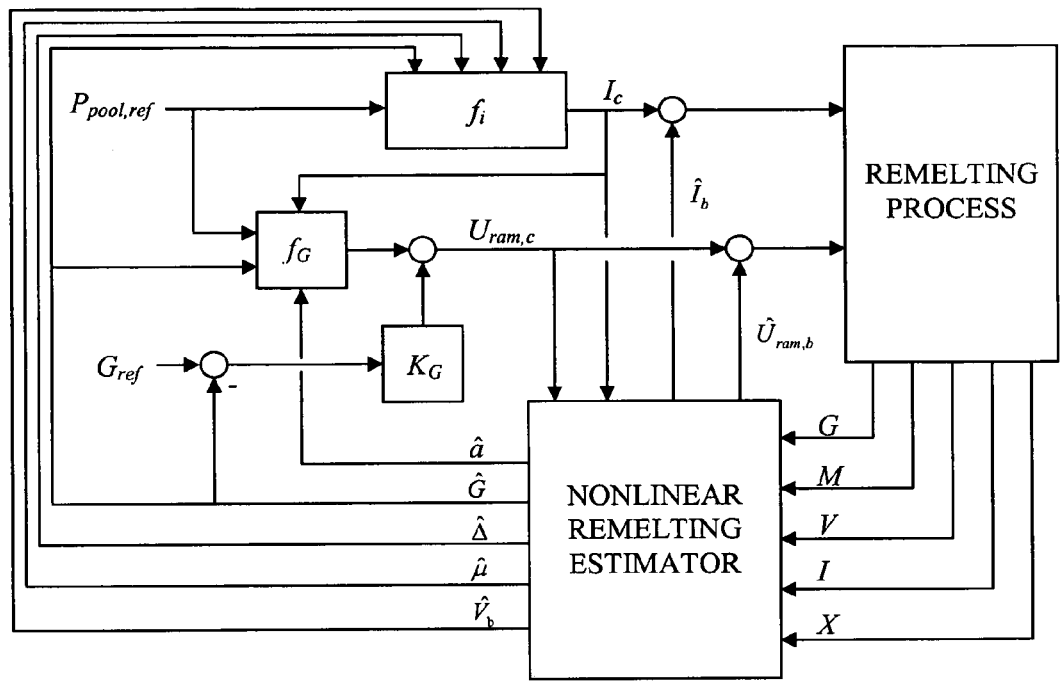
FIG. 1 is a schematic diagram of the preferred pool power controller of the invention, with reference inputs $G_{ref}$ and $P_{pool,ref}$ and process input commands $I_c$ and $U_{ram,c}$ (commanded electrode velocity); alternatively $X_{ram,c}$ (commanded electrode position),—the VAR estimator for this controller contains a model of the VAR melting dynamics and provides the estimated outputs shown given the measured furnace variables and process inputs.

The present invention is of a remelting apparatus and method wherein process control is accomplished primarily through control of pool power.

To reiterate, the most common form of modern VAR process control seeks to control process current and electrode gap. Typically, process current is controlled to a reference setpoint using a proportional-integral (PI) or proportional-integral-derivative (PID) control feedback loop. Electrode gap is usually controlled open loop by controlling the process either to a reference voltage or a reference drip-short frequency. Either method is based on the assumption that the electrode gap will be controlled to a constant value if the process is forced to faithfully track the voltage or drip-short frequency reference. Other important open loop variables are electrode melting rate, electrode tip shape, crown and shelf formation, power input to the ingot top surface (pool power), the ingot-crucible contact boundary, ingot surface morphology, and ingot pool shape (i.e., liquidus and solidus isotherms positions). Some of these variables are, of course, related. There are two commanded inputs to the system for VAR of nickel-base alloys: current ($I_c$ and electrode ram velocity ($U_{ram,c}$) or position ($X_{ram,c}$). There are two additional command inputs for titanium alloy melting: stirring coil current and reversal time.

A different means of control involves controlling electrode gap and electrode melting rate instead of electrode gap and process current. In this system, process current replaces electrode melting rate in the list of open loop variables. In other words, the current is made to be whatever it needs to be in order to meet the melting rate reference. A major difficulty with this method has to do with the fact that the relationship between electrode melting rate and melting power is both nonlinear and history dependent. This difficulty was addressed through the development of a nine-state advanced VAR (AVARC-I) control technology, as disclosed in U.S. Pat. No. 6,115,404 and in Williamson et al, "Model-Based Melt Rate Control during Vacuum Arc Remelting of Alloy 718," Metallurgical and Materials Transactions B, Volume 35B, February 2004, pp. 101-113.

The pool power controller of the present invention preferably employs the following assumptions: 1) a uniform, diffuse arc exists throughout the inter-electrode region; 2) contributions to pool power due to radiation may be neglected; 3) steady-state melt power all returns to the pool as enthalpy contained in the molten metal dripping from the electrode; and 4) arc plasma power is distributed between the pool and ingot wall above the pool according to simple geometry. Given these assumptions, the following equation may be derived describing the pool power:

$$P_{pool} = \frac{\dot{M} h_{sup}}{\rho} + \varepsilon[V_{CF}I + (R_I + R_G G)I^2] \quad (1)$$

where $$\dot{M} = -\frac{\rho A_e \alpha_r C_{S\Delta}}{\Delta} + \frac{\rho C_{Sp} \mu [V_{CF}I + (R_I + R_G G)I^2]}{h_m}. \quad (2)$$

In these equations, $\dot{M}$ is melt rate, $\rho$ is density at superheat temperature, $h_{sup}$ is volume specific enthalpy at superheat temperature, $\varepsilon$ is arc power fraction to the pool surface, $V_{CF}$ is the cathode fall voltage, I is the process current, $R_I$ is the VAR circuit resistance less the electrode gap resistance, $R_G$ is the experimentally determined electrode gap resistance parameter, G is electrode gap, $A_e$ is electrode cross-sectional area, $\alpha_r$ is room temperature thermal diffusivity, $C_{S\Delta}$ and $C_{Sp}$ are material dependent constants, $\mu$ is process efficiency, $\Delta$ is electrode thermal boundary layer, and $h_m$, is volume specific enthalpy at melt temperature. Note that the quantity enclosed in square brackets in these expressions defines the process electrical power function. This quantity multiplied by $\varepsilon$ gives the fraction of the total power collected at the pool surface from the arc plasma. Thus, Equation (1) states that the pool power is equal to the total enthalpy input due to the melting electrode plus the total arc plasma power collected by the pool surface.

If Equation (2) is substituted into Equation (1) and the result is solved for current, the pool power control equation of the invention is obtained:

$$I = \frac{-V_{CF}}{2(R_I + R_G G)} + \sqrt{\left(\frac{V_{CF}}{2(R_I + R_G G)}\right)^2 + \frac{P_{pool} + \frac{\alpha_r C_{S\Delta} A_e h_{sup}}{\Delta}}{\left(\frac{\mu C_{sp} h_{sup}}{h_m} + \varepsilon\right)(R_I + R_G G)}}. \quad (3)$$

This equation is preferred in order to find the current required to give pool power $P_{pool}$.

A nonlinear controller is then used that employs Equation (3). The result is similar to the AVARC-I controller, but reference inputs are $G_{ref}$ and $P_{pool,ref}$ instead of $G_{ref}$ and $\dot{M}_{ref}$. The process input commands are still $I_c$ and $U_{ram,c}$ or $X_{ram,c}$. A schematic diagram of the controller is shown in FIG. 1. The VAR estimator for this controller is preferably identical to that of AVARC-I and so the Kalman gains are the same.

The function boxes (controllers, which can be software or hardware components of a monolithic controller or implemented separately in hardware/software) in FIG. 1 have the following preferred definitions, in which a variable in angular brackets indicates a variable that is fed into the function box and a hat over a variable indicates an estimated quantity:

$$f_I = \frac{-(V_{CF} + \langle \hat{V}_b \rangle)}{2(R_I + R_G \langle \hat{G} \rangle)} + \sqrt{\left(\frac{(V_{CF} + \langle \hat{V}_b \rangle)}{2(R_I + R_G \langle \hat{G} \rangle)}\right)^2 + \frac{\langle P_{pool,ref} \rangle + \frac{\alpha_r C_{S\Delta} A_e h_{sup}}{\langle \hat{\Delta} \rangle}}{\left(\frac{\langle \hat{\mu} \rangle C_{Sp} h_{sup}}{h_m} + \varepsilon\right)(R_I + R_G \langle \hat{G} \rangle)}} \quad (4)$$

$$f_G = \frac{\langle \hat{\alpha} \rangle}{h_{sup} A_e} \{\langle P_{pool,ref} \rangle - \varepsilon[(V_{CF} + \langle \hat{V}_b \rangle)\langle I_c \rangle + (R_I + R_G \langle \hat{G} \rangle)\langle I_c \rangle^2]\} \quad (5)$$

$\hat{V}_b$ in these equations is the estimated voltage bias. Likewise, $\hat{I}_b$ and $\hat{U}_{ram,b}$ in FIG. 1 are estimated current bias and ram velocity bias, respectively.

As understood by one of ordinary skill in the art, analogous control of ESR systems can also be done with the present invention, with electrode gap being replaced by depth of electrode immersion in the slag.

INDUSTRIAL APPLICABILITY

The invention is further illustrated by the following non-limiting example, which shows the efficacy of the method and apparatus of the invention in controlling the VAR process to create high quality metal ingots.

Example 1

The pool power controller (method and apparatus) of the invention was tested on an existing VAR furnace. Three tests were performed, all melting 0.15 m (6 inch) diameter 304SS electrode into 0.22 m (8.5 inch) diameter ingot. Test 1 was used to work out hardware and software issues and will not be discussed. Test 2 (heat 03V-53) used a full 9-state controller to perform a factor space experiment to confirm control under different melting conditions. Test 3 (heat 03V-54) involved using the controller to melt through welds. For these tests, the arc power fraction was estimated to be 0.3.

Figure 2:
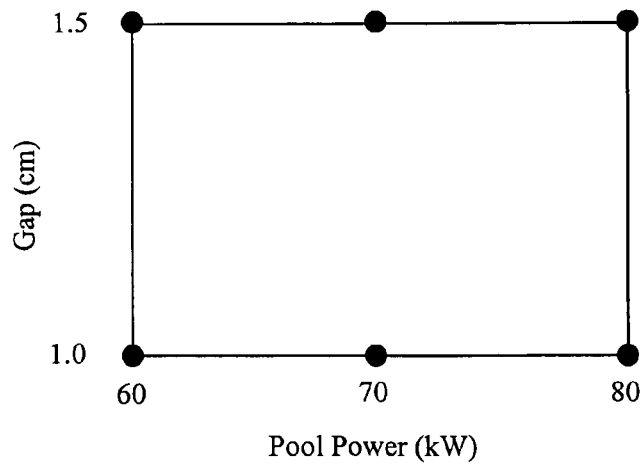
FIG. 2 is a diagram of the target factor space used for Test 2 of the example.
Figure 3:
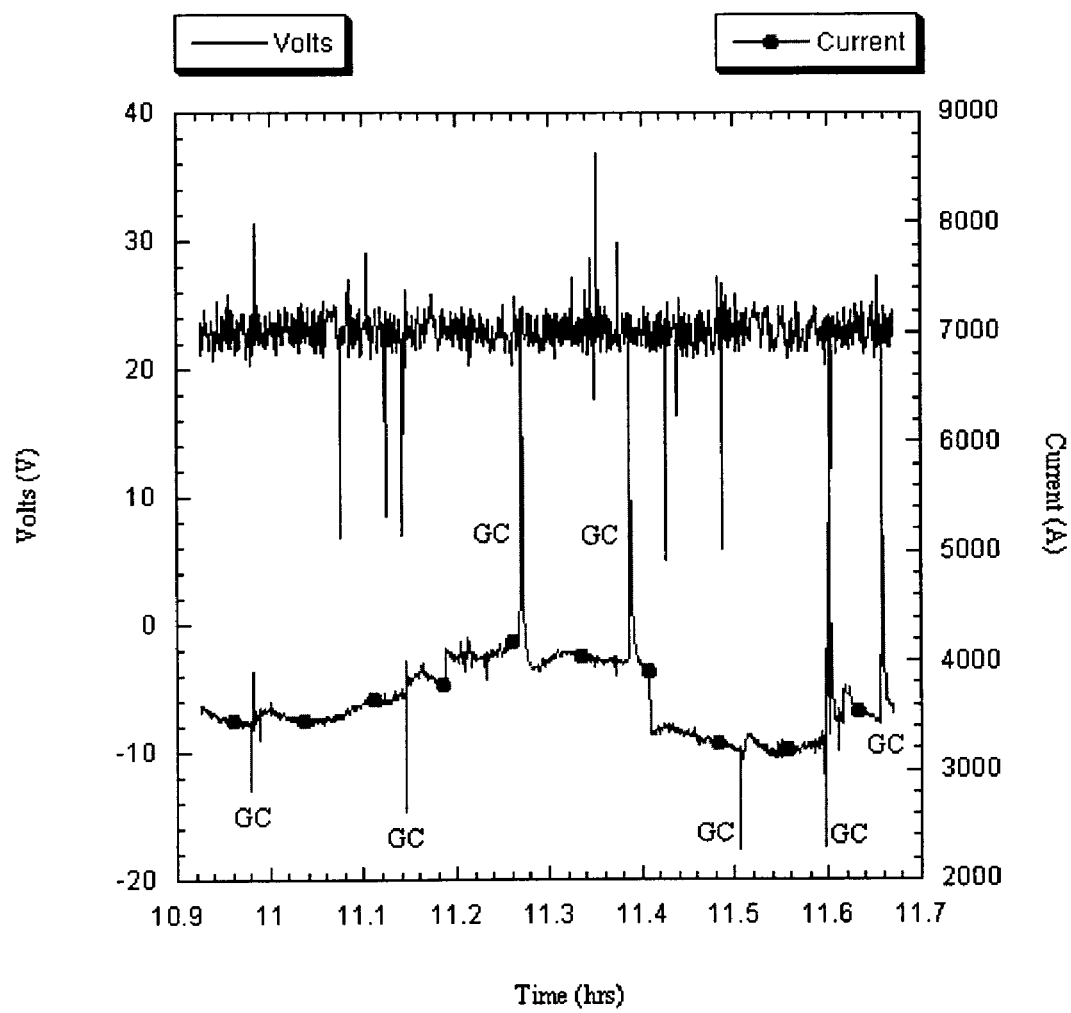
FIG. 3 is a graph of voltage and current traces for the factor space experiment of the example—the letters GC mark gap checks.
Figure 4:
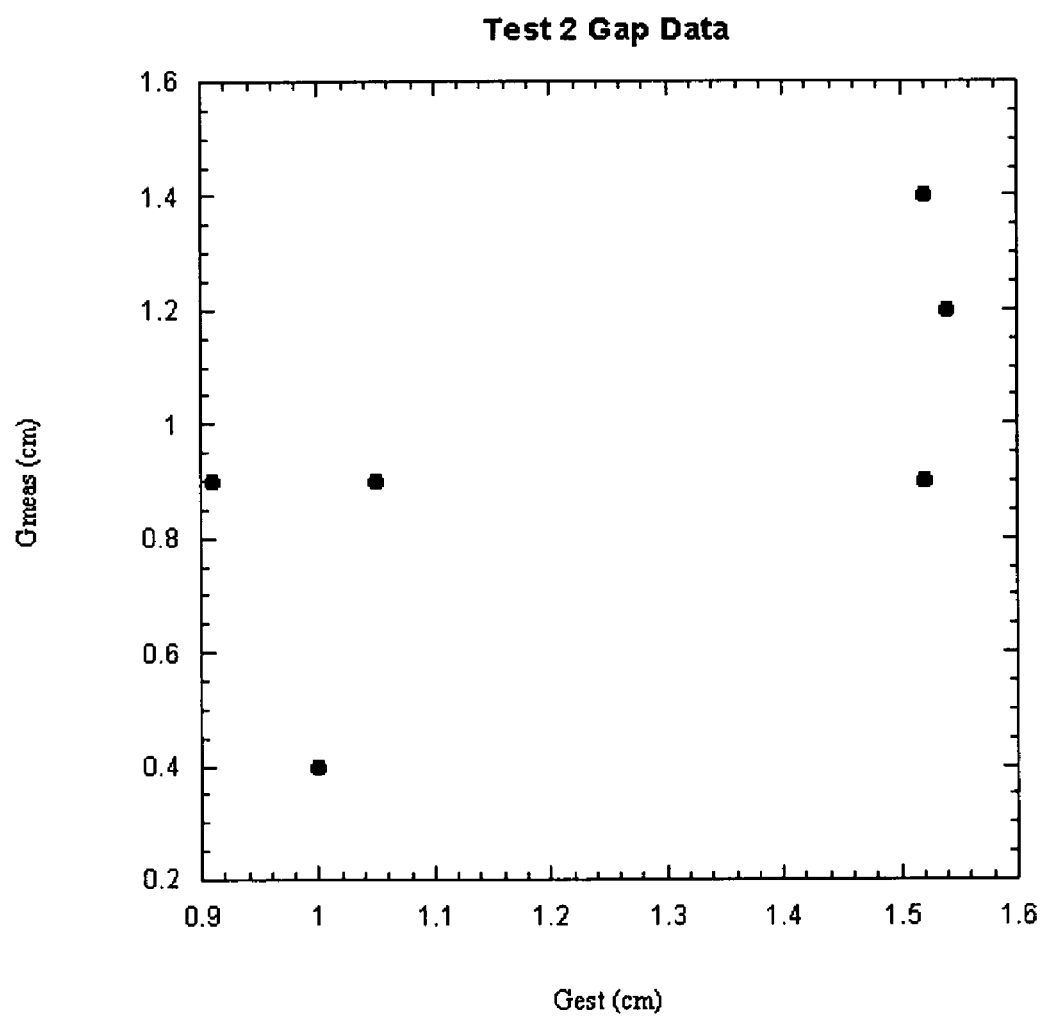
FIG. 4 is a plot of the gap check data against the estimated gap from the controller.

Test 2. A 158 kg electrode was melted at several different electrode gap and pool power settings. The various target conditions are shown in FIG. 2. FIG. 3 shows the voltage and current traces associated with this test. Seven gap checks were performed by driving the electrode down until a dead short occurred. Gap check 5 did not yield good data and the other measurements were somewhat noisy as can be seen in FIG. 4.

Figure 5:
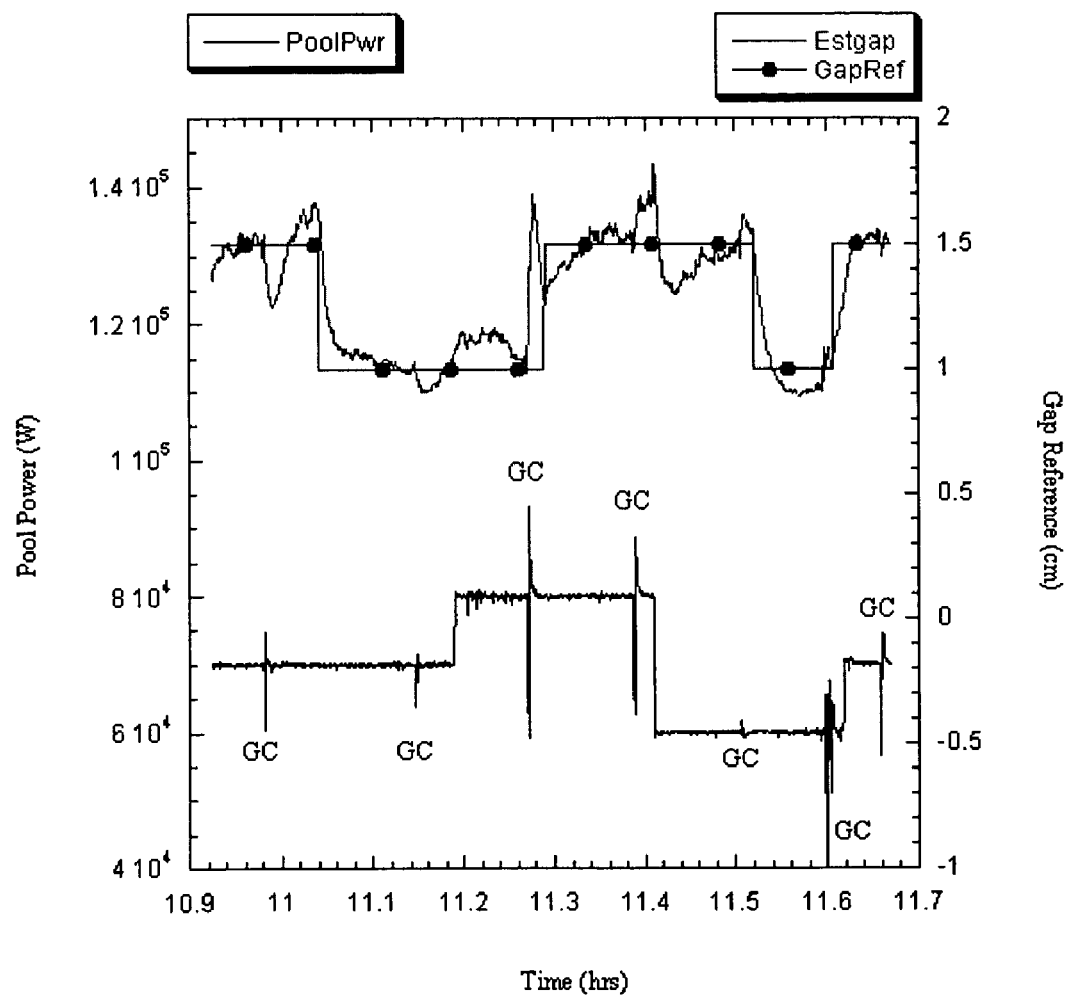
FIG. 5 is a plot of estimated pool power, electrode gap, and gap reference.

FIG. 5 shows plots of estimated pool power, gap, and gap reference. The figure shows that the estimator "believes" it is controlling the melt correctly. It is also seen that the gap checks constitute relatively severe perturbations to the estimated electrode gap. This coupled with the frequent changes in electrode gap reference probably accounts for much of the scatter in the plot shown in FIG. 4.

The controller of the invention can be tested for internal consistency by determining if the estimated pool powers used for the factor space all give a value of 0.3 for ε. ε can be calculated from the estimated pool power using the following equation:

$$\hat{\varepsilon} = \frac{\hat{P}_{pool} - \frac{\hat{M} h_{sup}}{\rho}}{V_{CF} + (R_I + R_G G_{meas})I_{meas}}. \quad (6)$$

Figure 6:
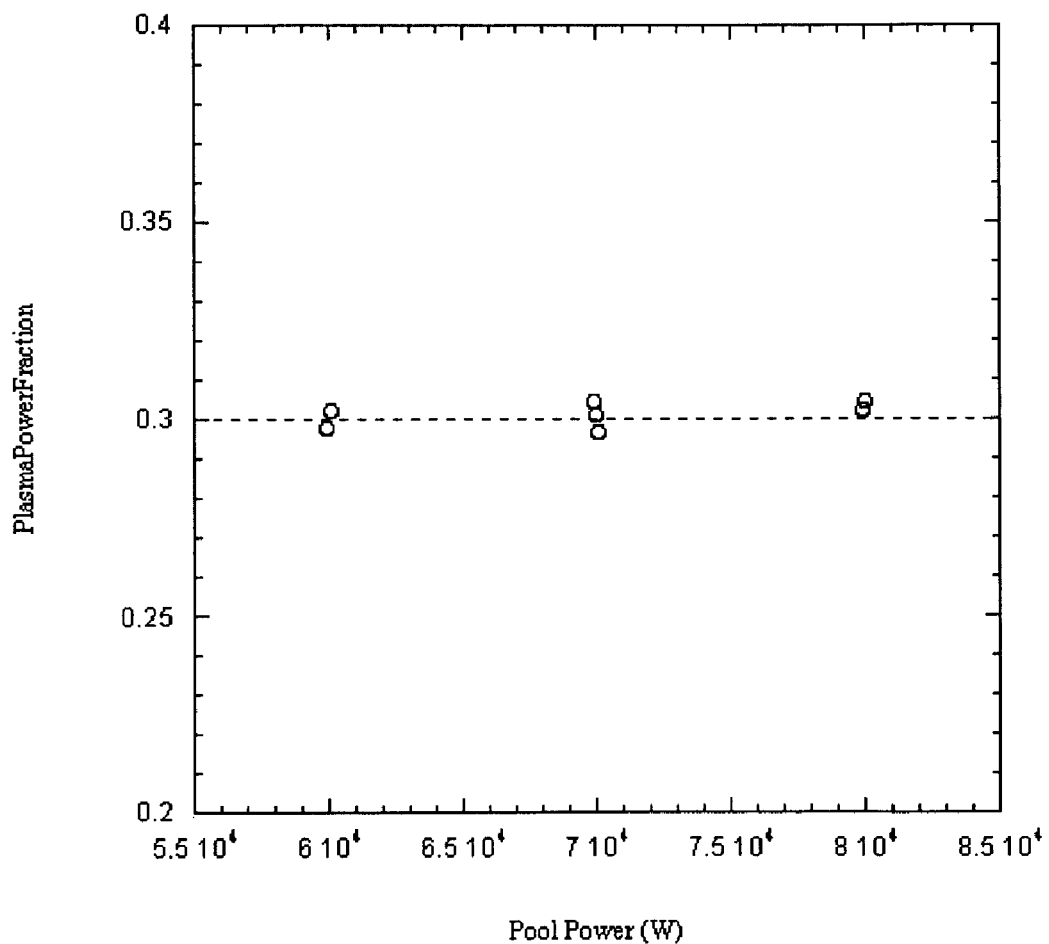
FIG. 6 is plot of the estimated pool power fraction for the three powers used in the factor space experiment.

The estimated power fraction obtained from Equation (6) and the estimated pool power data are plotted in FIG. 6. It is evident from this figure that the controller is functioning correctly even though there is no direct evidence that the pool power estimates are correct in an absolute sense.

Figure 7:
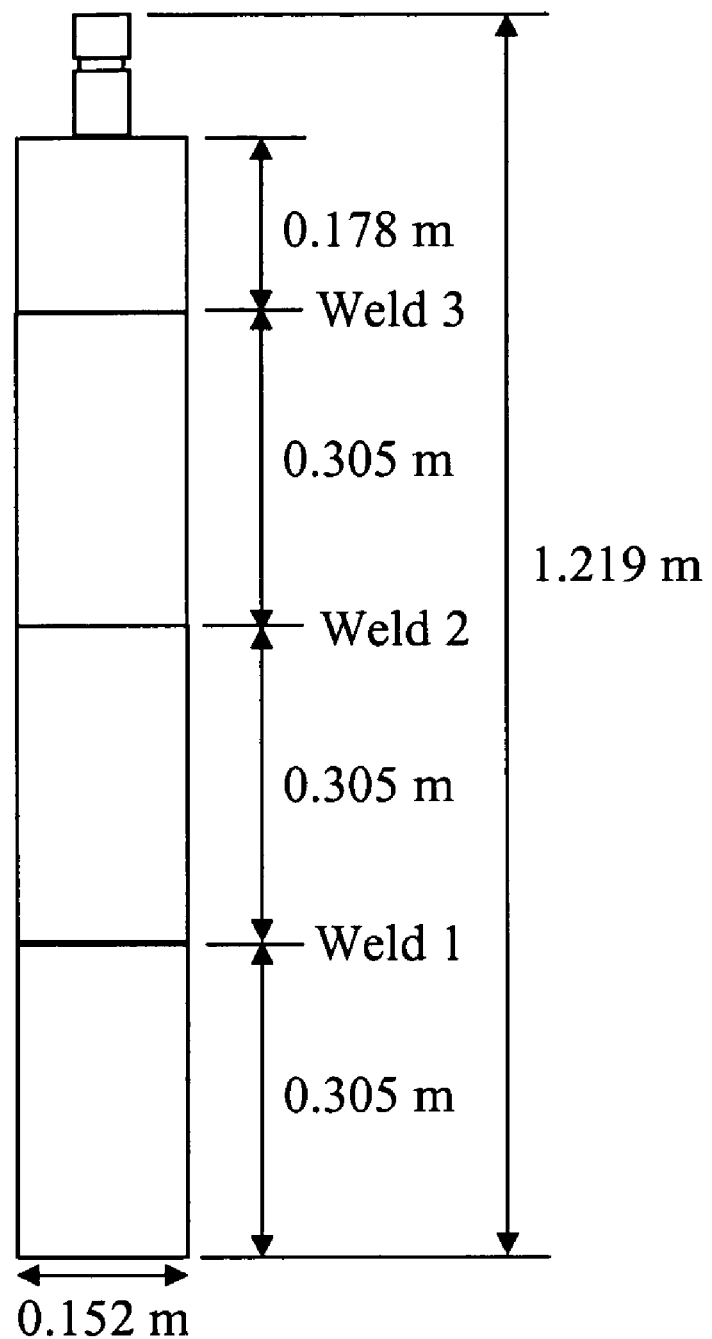
FIG. 7 is a depiction of the Test 3 electrode of the example showing the locations of the three welds—the electrode segments were gas tungsten arc (TIG) welded around the electrode circumference.

Test 3. A 158.5 kg electrode was melted using a full 9-state controller. The electrode consisted of four pieces butt-welded together as depicted in FIG. 7. Each weld extended around the electrode circumference and was performed without filler metal.

Figure 8:
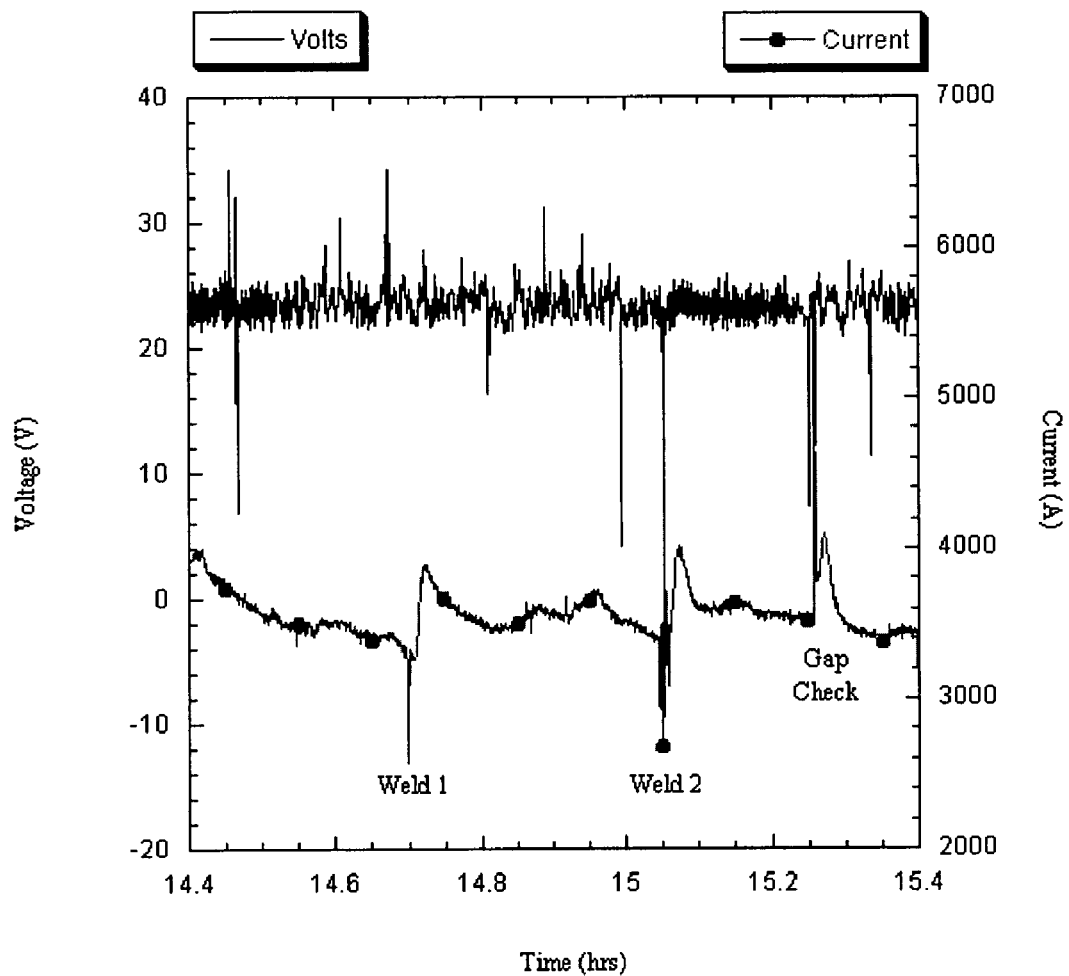
FIG. 8 is a plot showing voltage and current histories for Test 3.

FIG. 8 shows plots of the voltage and current histories for Test 3. The positions of the welds are marked in the figure with the exception of Weld 3, which occurred at the very end of melting. That is, the melt was shut off as soon as the weld was encountered. A gap check is also marked in the figure.

Figure 9:
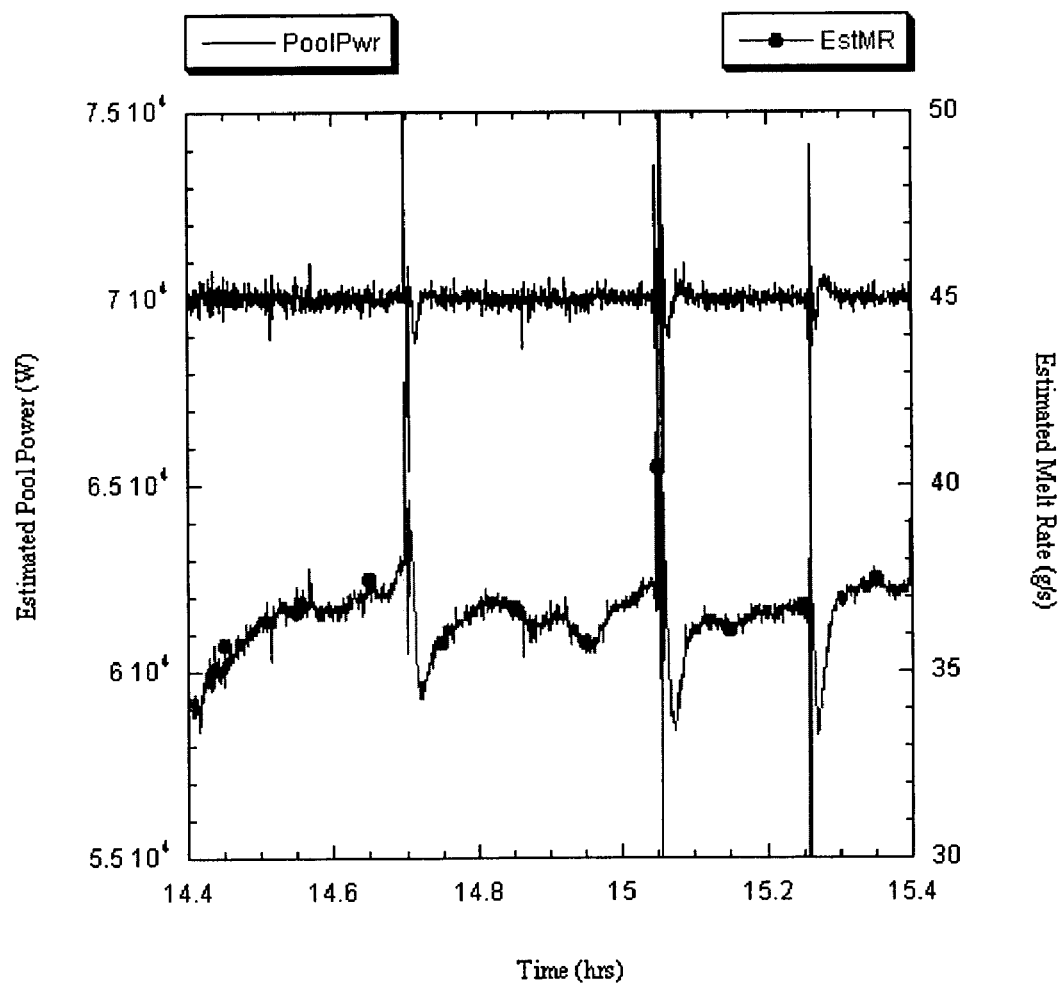
FIG. 9 is a plot showing estimated pool power and melt rate for Test 3.

FIG. 9 shows plots of estimated pool power and melt rate. Note the relatively flat power profile and the fluctuations in melt rate in response to the welds. It is seen that the controller is controlling pool power while letting the melt rate float open loop.

Figure 10:
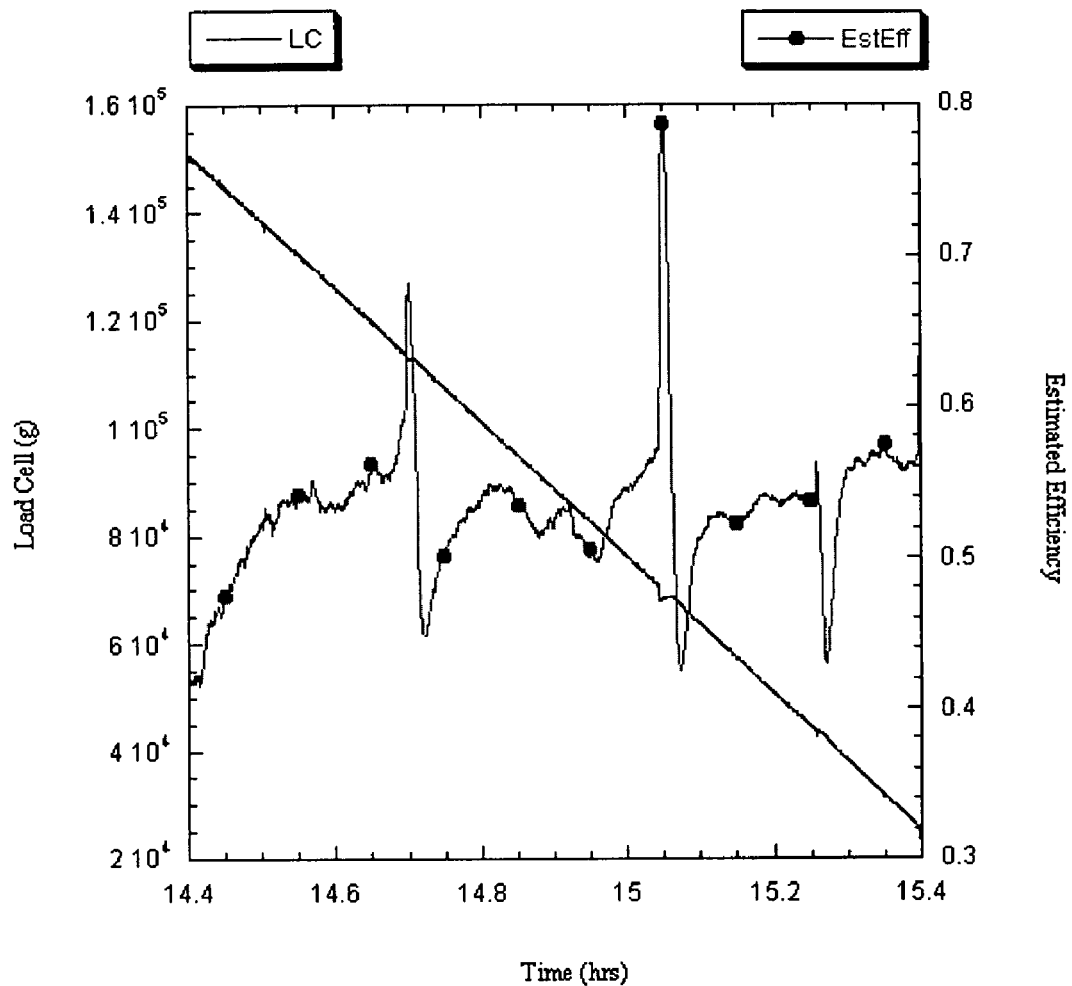
FIG. 10 is a plot showing load cell data and estimated efficiency for Test 3.

FIG. 10 shows load cell and estimated efficiency data for this test. Note the efficiency spikes associated with the "flat" spots in the load cell history. These regions correspond to pieces of electrode falling into the pool as the melt zone encounters the welds. Analysis shows that 0.710 kg of material fell in during the first, 2.410 kg during the second, and 2.160 kg during the third weld event. The sudden loss in weight causes the efficiency to spike: the controller "thinks" that this material has melted instantaneously. It responds by dropping the current (FIG. 8). However, the controller soon recovers and raises the current once it detects that the melt rate has actually slowed due to the melt zone encountering the "cold" material above the weld.

The ingot was sliced lengthwise, polished, and macro-etched. The melt pool profile was visible in the two places where electrode sections fell in when the welds were melted through. The columnar grain structure was maintained through the regions marking the weld effects. Thus, it appears that the electrode fall-in material melted after initially chilling the melt pool. Also visible was the porosity and rough ingot top due to the fact that the melt was terminated at full power when the third weld was melted though.

The tests described above demonstrate pool power control under the assumptions used to derive Equation (3). The controller held estimated pool power at its reference setpoint by manipulating melt rate. Gap control during the factor space experiment was characterized by a significant amount of noise, much of which was probably due to the frequent gap checks and setpoint changes.

The preceding example can be repeated with similar success by substituting the generically or specifically described reactants and/or operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of controlling a remelting furnace having a crucible provided with an ingot pool, an upper electrode comprising an upper portion and a tip and an inter-electrode region between the ingot pool and upper electrode, the method comprising the steps of:

adjusting current supplied to the upper electrode based upon a predetermined pool power reference value, the pool power reference value comprising the sum total of a melt power entering the ingot pool due to enthalpy contained in molten metal dripping from the upper electrode plus a fraction of an electrical arc plasma power collected by the ingot pool; wherein the melt power is the energy input into the ingot pool due to heat carried by molten metal dripping from the upper electrode tip, wherein enthalpy is the heat contained in the dripping molten metal, wherein electrical arc plasma power is the sum of the electrical power collected by the upper electrode tip, crucible wall and ingot pool from an electrical arc burning throughout the inter-electrode region; and adjusting the upper electrode drive speed based upon the predetermined pool power reference value.

2. The method of claim 1 additionally comprising the step of providing the adjustment to the current supplied to the upper electrode and the adjustment to the upper electrode drive speed as inputs to the remelting furnace.

3. The method of claim 2 wherein the step of providing the adjustment to the current supplied to the upper electrode and the adjustment to the upper electrode drive speed as inputs to the remelting furnace is accomplished through a non-linear control method.

4. The method of claim 2 wherein the steps of providing the adjustment to the current supplied to the upper electrode and the adjustment to the upper electrode drive speed are also based upon output from the method of controlling of a remelting furnace.

5. The method of claim 4 wherein the step of adjusting current supplied to the upper electrode employs an estimated current bias output from the method of controlling a remelting furnace.

6. The method of claim 4 wherein the step of adjusting the upper electrode drive speed employs an estimated upper electrode drive speed bias output from the method of controlling a remelting furnace.

7. The method of claim 2 wherein the controller employs the following equation to find the amount of current to be applied to the upper electrode to achieve the pre-determined pool power reference value:

$$I = \frac{-V_{CF}}{2(R_I + R_G G)} + \sqrt{\left(\frac{V_{CF}}{2(R_I + R_G G)}\right)^2 + \frac{P_{pool} + \frac{\alpha_r C_{SA} A_e h_{sup}}{\Delta}}{\left(\frac{\mu C_{Sp} h_{sup}}{h_m} + \varepsilon\right)(R_I + R_G G)}} \; ;$$

wherein $P_{pool}$ is a pool power reference setpoint, $h_{sup}$ is a volume specific enthalpy at superheat temperature, $\epsilon$ is an arc power fraction to the pool surface, $V_{CF}$ is a cathode fall voltage, $R_I$ is a VAR circuit resistance less an electrode gap resistance, $R_G$ is an experimentally determined electrode gap resistance parameter, G is an electrode gap, $A_e$ is an electrode cross-sectional area, $\alpha_r$ is a room temperature thermal diffusivity, $C_{SA}$ and $C_{Sp}$ are material dependent constants, $\mu$ is a process efficiency, $\Delta$ is an electrode thermal boundary layer, and $h_m$ is a volume specific enthalpy at melt temperature.

8. The method of claim 1 wherein the step of adjusting current supplied to the upper electrode employs the following equation:

$$f_I = \frac{-(V_{CF} + \langle \hat{V}_b \rangle)}{2(R_I + R_G \langle \hat{G} \rangle)} + \sqrt{\left(\frac{(V_{CF} + \langle \hat{V}_b \rangle)}{2(R_I + R_G \langle \hat{G} \rangle)}\right)^2 + \frac{\langle P_{pool,ref} \rangle + \frac{\alpha_r C_{SA} A_e h_{sup}}{\langle \hat{\Delta} \rangle}}{\left(\frac{\langle \hat{\mu} \rangle C_{Sp} h_{sup}}{h_m} + \varepsilon\right)(R_I + R_G \langle \hat{G} \rangle)}} \; ;$$

wherein $P_{pool}$ is a pool power reference setpoint, $h_{sup}$ is a volume specific enthalpy at superheat temperature, $\epsilon$ is an arc power fraction to the pool surface, $V_{CF}$ is a cathode fall voltage, $R_1$ is a VAR circuit resistance less an electrode gap resistance, $R_G$ is an experimentally determined electrode gap resistance parameter, G is an electrode gap, $A_e$ is an electrode cross-sectional area, $a_{rr}$ is a room temperature thermal diffusivity, $C_{SA\ and\ CSp}$ are material dependent constants, $\mu$ is a process efficiency, $\Delta$ is an electrode thermal boundary layer, and $h_m$ is a volume specific enthalpy at melt temperature, $V_b$ is a voltage bias, a circumflex over a variable indicates that it is an estimated value supplied by a nonlinear remelting estimator, and the angular brackets indicate variables supplied to the equation as opposed to constants.

9. The method of claim 1 wherein the step of adjusting the upper electrode drive speed employs the following equation:

$$f_G = \frac{\langle \hat{a} \rangle}{h_{sup} A_e} \{\langle P_{pool,ref} \rangle - \varepsilon[(V_{CF} + \langle \hat{V}_b \rangle)\langle I_c \rangle + (R_I + R_G \langle \hat{G} \rangle)\langle I_c \rangle^2]\};$$

wherein $P_{pool}$ is a pool power reference setpoint, $h_{sup}$ is a volume specific enthalpy at superheat temperature, $\epsilon$ is an arc power fraction to the pool surface, $V_{CF}$ is a cathode fall voltage, $R_1$ is a VAR circuit resistance less an electrode gap resistance, $R_G$ is an experimentally determined electrode gap resistance parameter, G is an electrode gap, $A_e$ is an electrode cross-sectional area, $I_c$ is a commanded current, a circumflex over a variable indicates that it is an estimated value supplied by a nonlinear remelting estimator, and angular brackets indicate variables supplied to the equation as opposed to constants.

10. The method of claim 1 wherein the step of adjusting the upper electrode drive speed is additionally based upon a predetermined gap distance of the upper electrode from a surface of a pool of molten metal or a predetermined depth of the upper electrode in slag.

* * * * *